(12) United States Patent
Yu et al.

(10) Patent No.: US 10,576,561 B2
(45) Date of Patent: Mar. 3, 2020

(54) STAGE DEDUSTING SHIELD FOR DUST-FREE TABLE SAW

(71) Applicant: YONGKANG CONGZHEN TOOLS CO., LTD, Jinhua, Zhejiang Province (CN)

(72) Inventors: Mincan Yu, Shanghai (CN); Hesheng Wu, Jiujiang (CN)

(73) Assignee: YONGKANG CONGZHEN TOOLS CO., LTD (CN)

(*) Notice: Subject to any disclaimer, the term of this patent is extended or adjusted under 35 U.S.C. 154(b) by 0 days.

(21) Appl. No.: 15/963,612

(22) Filed: Apr. 26, 2018

(65) Prior Publication Data

US 2019/0240750 A1    Aug. 8, 2019

(30) Foreign Application Priority Data

Feb. 8, 2018 (CN) .......................... 2018 1 0130389

(51) Int. Cl.
  *B23D 59/00* (2006.01)
  *B27B 5/29* (2006.01)
  *B27B 5/24* (2006.01)

(52) U.S. Cl.
  CPC .............. *B23D 59/006* (2013.01); *B27B 5/29* (2013.01); *B27B 5/243* (2013.01); *Y10T 83/207* (2015.04); *Y10T 83/773* (2015.04); *Y10T 83/7734* (2015.04)

(58) Field of Classification Search
  CPC ... B23D 59/006; Y10T 83/207; Y10T 83/773; Y10T 83/7734; Y10T 83/2077; B27G 19/02; B23Q 11/06; B23Q 11/0046
  USPC .............. 83/478, 471.2, 471.3, 440.2, 477.2
  See application file for complete search history.

(56) References Cited

U.S. PATENT DOCUMENTS

| | | | | |
|---|---|---|---|---|
| 4,192,104 A * | 3/1980 | Patenaude | ............... | B24B 55/06 144/252.1 |
| 4,367,665 A * | 1/1983 | Terpstra | ............... | B23D 59/006 83/100 |
| 4,403,534 A * | 9/1983 | Altendorf | ............ | B23D 59/006 144/252.1 |
| 6,796,208 B1 * | 9/2004 | Jorgensen | ............ | B23D 59/006 83/100 |
| 7,891,278 B2 * | 2/2011 | Liu | ........................ | B27G 19/02 83/102.1 |

(Continued)

FOREIGN PATENT DOCUMENTS

| DE | 4205965 C1 * | 7/1992 | ......... B23Q 11/0046 |
|---|---|---|---|
| DE | 9306198 U1 * | 8/1993 | ............. B23Q 11/06 |

(Continued)

*Primary Examiner* — Laura M Lee
(74) *Attorney, Agent, or Firm* — PROI Intellectual Property US

(57) ABSTRACT

The present invention pertains to the technical field of shields, and in particular, relates to a stage dedusting shield for a dust-free table saw, comprising: a shield assembly and a dust suction cover assembly; wherein the dust suction cover assembly is mounted between a follower board and a rear portion of a saw blade and is fixed by the follower board and a rear rocker arm. The dust suction cover assembly comprises a dust suction cover and a rear rocker arm sleeved onto the exterior of the dust suction cover, wherein the dust suction cover and the rear rocker arm are movably connected to a dust suction cover torsion spring via a dust suction cover rotary pin.

7 Claims, 4 Drawing Sheets

(56) References Cited

U.S. PATENT DOCUMENTS

| | | | | |
|---|---|---|---|---|
| 2008/0022827 A1* | 1/2008 | Weir | ............ | B27G 19/02 |
| | | | | 83/478 |
| 2009/0178593 A1* | 7/2009 | Yu | ............ | B23D 59/006 |
| | | | | 108/28 |
| 2010/0037740 A1* | 2/2010 | Lin | ............ | B23D 59/006 |
| | | | | 83/100 |
| 2011/0162501 A1* | 7/2011 | Koegel | ............ | B23D 59/006 |
| | | | | 83/100 |
| 2011/0179923 A1* | 7/2011 | Tsuda | ............ | B23D 59/006 |
| | | | | 83/100 |
| 2012/0090439 A1* | 4/2012 | Butler | ............ | B23D 59/006 |
| | | | | 83/68 |
| 2016/0332244 A1* | 11/2016 | Koegel | ............ | B23Q 17/2404 |

FOREIGN PATENT DOCUMENTS

| | | | | |
|---|---|---|---|---|
| DE | 9420880 U1 * | 6/1995 | ............ | B23D 47/025 |
| DE | 29508107 U1 * | 9/1996 | ............ | B23Q 11/0046 |
| DE | 19541293 A1 * | 5/1997 | ............ | B23Q 11/06 |
| EP | 780194 B1 * | 11/2001 | ............ | B23D 59/006 |
| EP | 1925388 A1 * | 5/2008 | ............ | B23D 45/06 |
| EP | 2260987 A1 * | 12/2010 | ............ | B23D 59/006 |
| FR | 2543873 A1 * | 10/1984 | ............ | B23Q 11/0046 |
| FR | 2722723 A1 * | 1/1996 | ............ | B27G 19/02 |
| WO | WO-2015102909 A1 * | 7/2015 | ............ | B23Q 17/2404 |

* cited by examiner

STAGE DEDUSTING SHIELD FOR DUST-FREE TABLE SAW

TECHNICAL FIELD

The present invention relates to the technical field of shields, and in particular, relates to a stage dedusting shield for a dust-free table saw.

BACKGROUND

According to the standards and use habits of a table saw, the movable shield on the table saw needs to ensure that cutting the wood is observed and that safety protection is achieved. However, the wood chips and dusts on the stage and the workpiece may not be cleared, which causes impacts to the health of the operator and causes pollution to the environment.

Chinese invention patent publication No. CN101961798A titled "TABLE SAW" and published on Feb. 2, 2011 has disclosed a table saw. The table saw comprises: a working stage, having a working table for placing the workpiece; a base, arranged beneath the working stage and having an inner cavity; a round saw blade, positioned in the inner cavity of the base and extending to pass through the working table of the working stage; a follower board, operably rising or falling with the round saw blade; and a shield, movably connected to the follower board, and positioned above the round saw blade. The follower board is provided with a stopping mechanism, and the shield is provided with a mating device, wherein the mating device is selectively connected to the stopping mechanism, such that the shield is prevented from continuously moving upwards. Such shield for the table stage is capable of better protecting the saw blade, and accommodating cutting needs of workpieces having different thicknesses, such that the operator is constantly protected by the shield during cutting and thus may not be in contact with the saw blade, thereby improving safety during cutting. However, such shield is provided with no dust suction connector or no auxiliary shield, and thus the dedusting effect is poor. During cutting, although a portion of the wood chips and dusts are blocked by the wood blocks and the shield, the wood chips and dusts may not be collected. In addition, at the moment when the wood is totally cut off, due to lack of blocking by the wood, the wood chips and dusts generated at this moment are all threw out by the saw blade and fly towards the operator. As a result, impacts are caused to the operator and environment.

The saw blades in the conventional table saws all rotate clockwise for cutting (from the tail of the motor), during workpiece cutting, wood chips and dusts generated at the front end of the saw blade (close to the saw teeth of the operator) are brought by the saw blade down to the underneath of the stage, and the wood chips generated at the rear portion of the saw blade (close to the saw teeth of the follower board) are generally aggregated at the workpiece and the stage. Accordingly, the present invention provides a dust suction cover mounted between a follower board and a rear portion of a saw blade, and a dedusting shield mounted between a front portion of the saw blade and the dust suction cover.

In conclusion, to solve the problem in the prior art, it is currently urgent to provide a stage dedusting shield for a dust-free table saw having a compact structure, a high dust suction efficiency and a wide application scope.

SUMMARY

The present invention provides a stage dust suction assembly mounted between a rear portion of a saw blade and a follower board, which is compact in structure and more convenient to operate, and has a high dust suction efficiency, and thus is a stage dedusting shield for a dust-free table saw featuring an extensive application scope and solves the problem in the prior art.

To solve the above technical problem, the present invention employs the following technical solution:

The present invention provides a stage dedusting shield for a dust-free table saw, comprising: a shield assembly and a dust suction cover assembly; wherein the dust suction cover assembly is mounted between a follower board and a rear portion of a saw blade and is fixed by the follower board and a rear rocker arm. Since the saw blades in the conventional table saws all rotate clockwise for cutting (from the tail of the motor), during workpiece cutting, wood chips and dusts generated at the front end of the saw blade (close to the saw teeth of the operator) are brought by the saw blade down to the underneath of the stage, and the wood chips generated at the rear portion of the saw blade (close to the saw teeth of the follower board) are generally aggregated at the workpiece and the stage. According to the present invention, the wood chips and dusts generated by secondary cutting of the saw blade may be absolutely suctioned by the dust suction cover via a dust suction pipe, thereby achieving dust-free wood cutting.

Further, the dust suction cover assembly comprises a dust suction cover and a rear rocker arm sleeved onto the exterior of the dust suction cover.

Further, a lower dust suction cover is connected under the dust suction cover, wherein the lower dust suction cover is connected to the dust suction cover via a lower dust suction cover rotary pin and a lower dust suction cover torsion spring. The lower dust suction cover is horizontal at the bottom, and constantly maintains parallelly contact with the wood during workpiece feeding, thereby achieving a better protection effect.

Further, the rear rocker arm is fixed to the follower board via a rocker arm positioning screw, a positioning press spring and a locking handle.

Further, the rear rocker arm is connected to the shield assembly via a positioning steel wire, a rotary shaft and a screw, and the shield assembly comprises a front rocker arm, a right shield and a left shield. The front rocker arm rotates upwards for positioning relative to the rear rocker arm. In this way, during cutting, the saw blade may be more visually observed, and the dust suction effect is not affected.

Further, the front rocker arm is connected to a right shield and a left shield via a shield screw. The right shield and the left shield connected via the shield screw may be automatically adjusted upwards during workpiece feeding, which satisfies the safety requirements during cutting.

Further, the dust suction cover is connected to a front shield via the dust suction cover rotary pin, a front shield torsion spring and the dust suction cover torsion spring. The front shield rotates along with the dust suction cover, such that the wood chips are effectively protected from flying towards the operator and the wood chips are suctioned by the suction pipe.

The present invention has the following advantages and achieves the following beneficial effects:

The stage dedusting shield for a dust-free table saw according to the present invention comprises a shield assembly and a dust suction cover assembly; wherein the dust suction cover assembly is mounted between a follower board and a rear portion of a saw blade and is fixed by the follower board and a rear rocker arm. During workpiece cutting, the saw blades in the conventional table saws all rotate clockwise for cutting (from the tail of the motor), during workpiece cutting, wood chips and dusts generated at the front end of the saw blade (close to the saw teeth of the operator) are brought by the saw blade down to the underneath of the stage, and the wood chips generated at the rear portion of the saw blade (close to the saw teeth of the follower board) are generally aggregated at the workpiece and the stage. According to the present invention, the wood chips and dusts generated by secondary cutting of the saw blade may be absolutely suctioned by the dust suction cover via a dust suction pipe. Therefore, the dust suction cover assembly arranged between the follower board and the rear portion of the saw blade achieves dust-free wood cutting. During wood block cutting, when the wood blocks are fed forwardly, the left and right shields, and the lower dust suction cover are automatically adjusted upwards according to the size of the wood blocks. During the upward adjustment, the left and right shields, and the lower dust suction cover are constantly in contact with the wood blocks, thereby achieving a good protection effect. In addition, the front rocker arm, and the left and right shield rotates upwards for positioning relative to the rear rocker arm. In this way, during cutting, the saw blade may be more visually observed, and the dust suction effect is not affected.

BRIEF DESCRIPTION OF THE DRAWINGS

To describe embodiments of the present invention or the technical solution in the related art, hereinafter, drawings that are to be referred for description of the embodiments or the related art are briefly described. Apparently, the drawings described hereinafter merely illustrate some embodiments of the present invention. Persons of ordinary skill in the art may also derive other drawings based on the drawings described herein without any creative effort.

Figure 1:
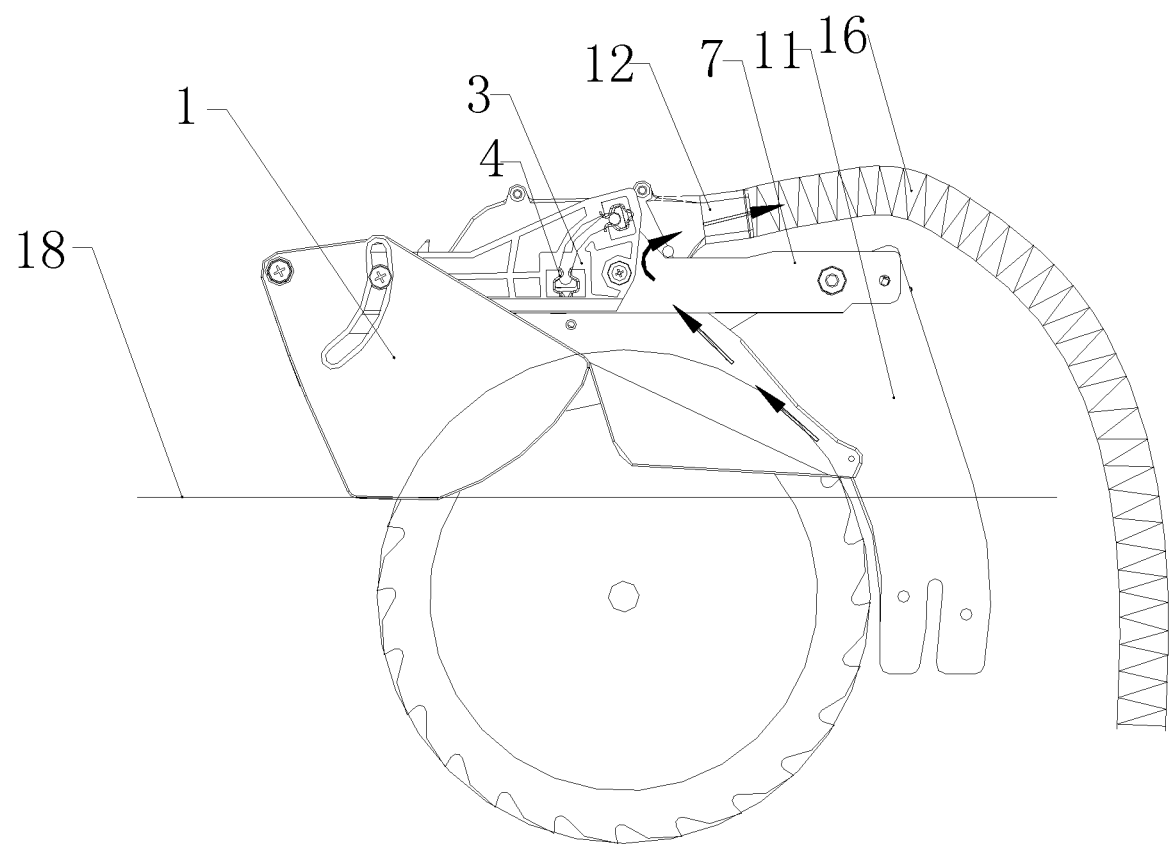
FIG. 1 is a schematic view of a stage dedusting shield for a dust-free table saw according to the present invention.

Reference numerals and denotations thereof: 1—right shield, 2—shield torsion spring, 2—front rocker arm, 4—positioning steel wire, 5—left shield, 6—saw blade, 7—rear rocker arm, 8—rocker arm positioning screw, 9—positioning press spring, 10—locking handle, 11—follower board, 12—dust suction cover, 13—dust suction cover torsion spring, 14—lower dust suction cover torsion spring, 15—lower dust suction cover. 16—dust suction soft pipe, 17—wood block, 18—working stage, 19—lower dust suction cover rotary pin, 20—dust suction cover rotary pin, 21—shield screw, 22—front shield, and 23—front shield torsion spring.

DETAILED DESCRIPTION

The present invention is further described with reference to and the attached drawings and specific embodiments. It should be noted herein that description of these embodiments is intended to help understanding of the present invention, instead of construing any limitation to the present invention. In addition, technical features involved in various embodiments of the present invention described hereinafter may be combined as long as these technical features are not in conflict.

Figure 2:
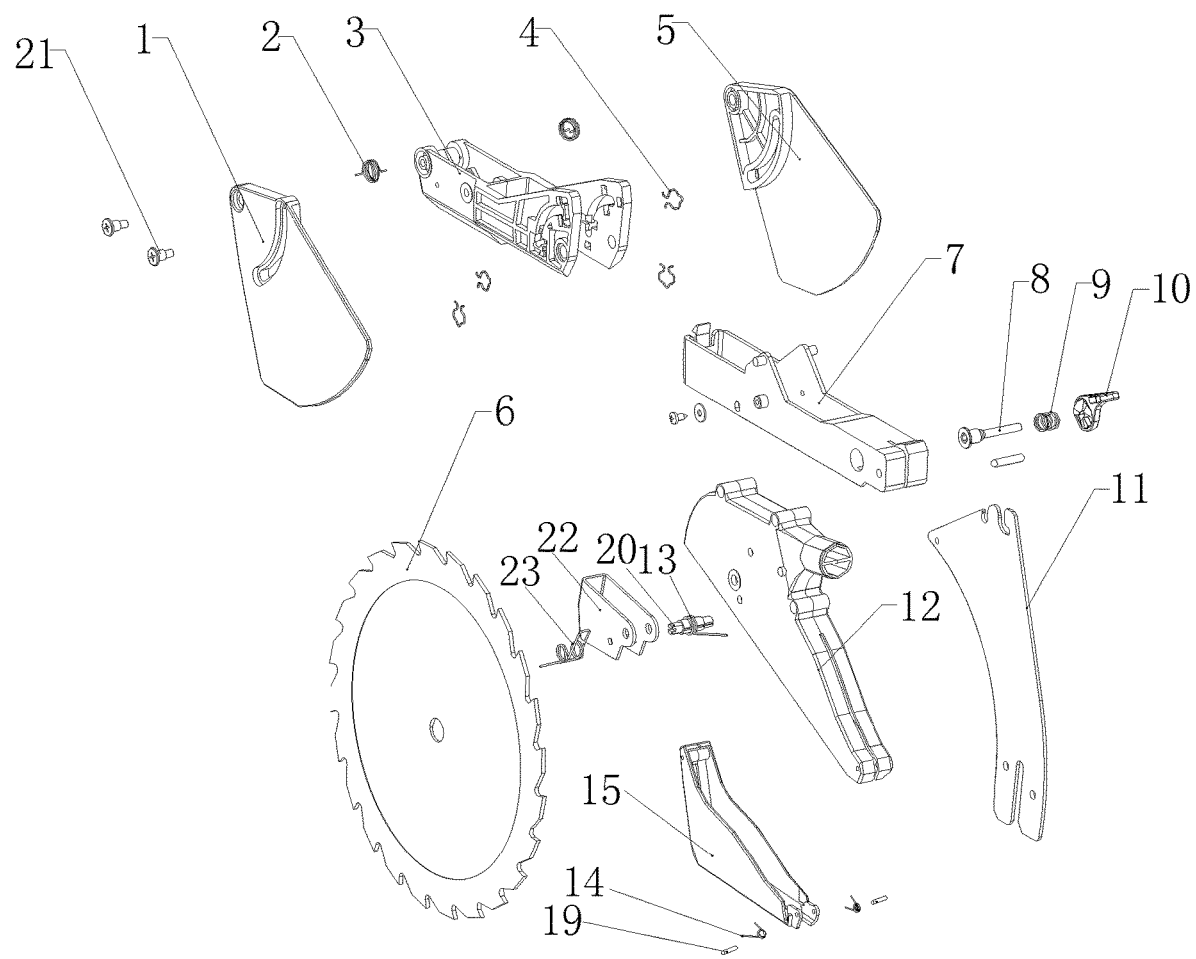
FIG. 2 is an exploded view of a dedusting shield in the stage dedusting shield for a dust-free table saw according to the present invention.
Figure 3:
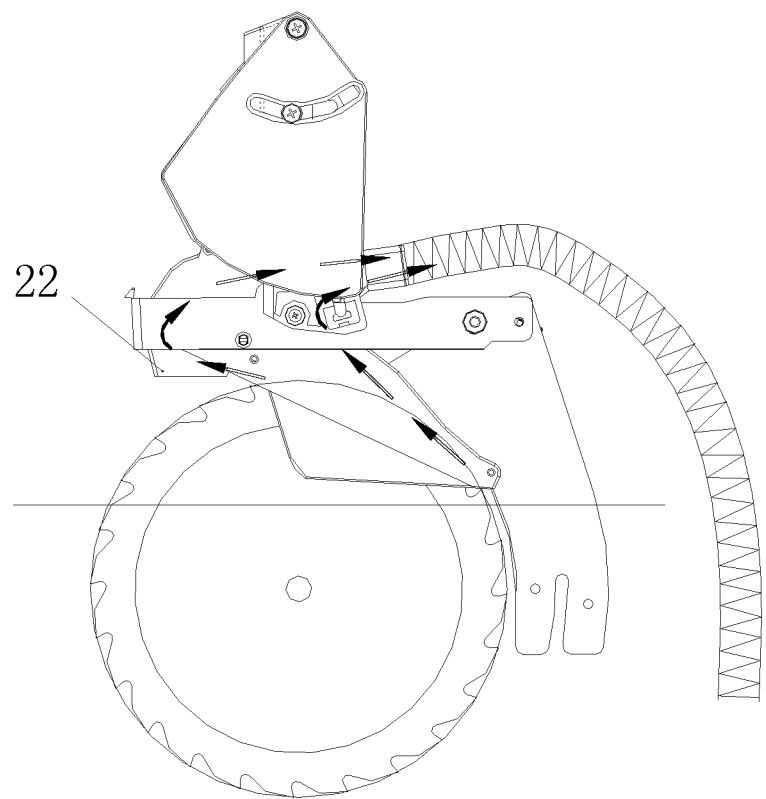
FIG. 3 is a schematic structural view when the dedusting shield in the stage dedusting shield for a dust-free table saw according to the present invention is raised.
Figure 4:
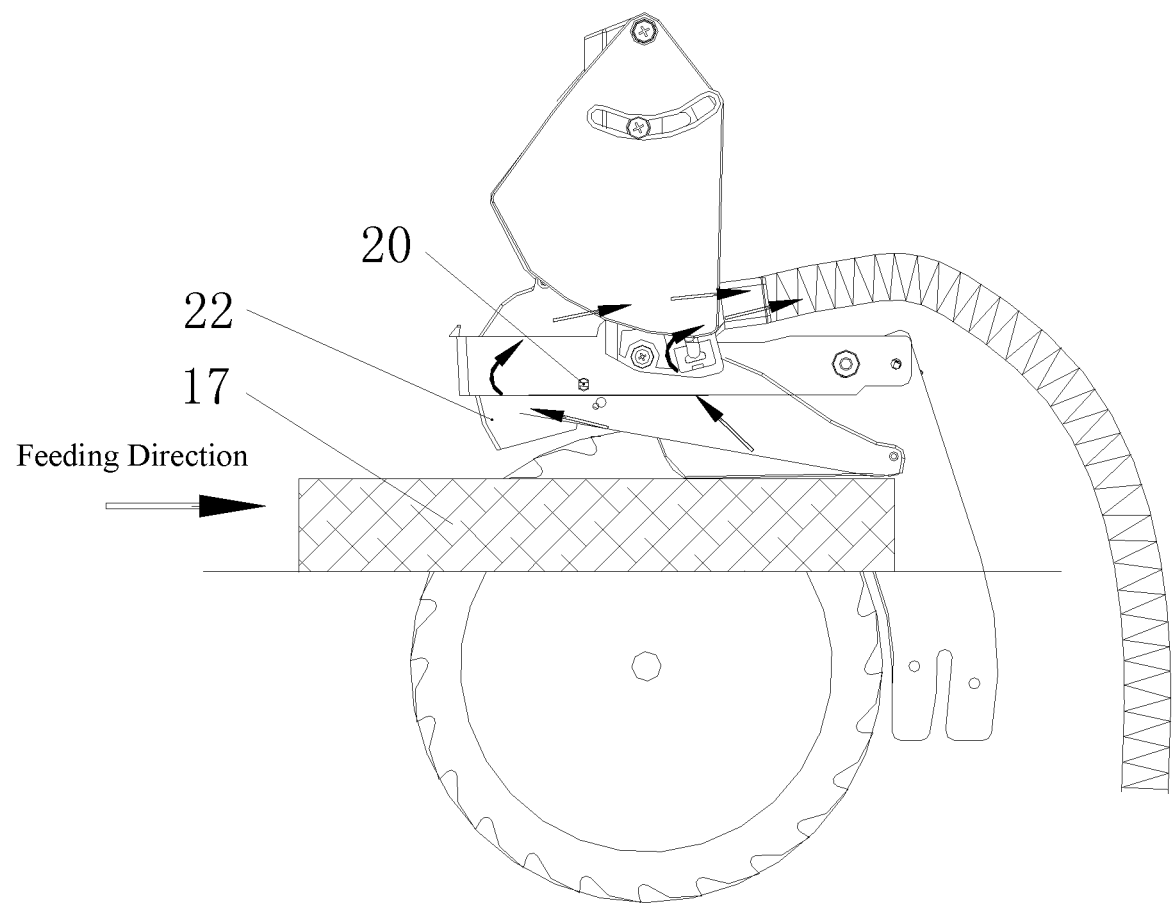
FIG. 4 is a schematic view of a working state of the stage dedusting shield for a dust-free table saw according to the present invention.

Referring to FIG. 1, FIG. 2, FIG. 3 and FIG. 4, a schematic view of a stage dedusting shield for a dust-free table saw, an exploded view of a dedusting shield, and a schematic structural view when the dedusting shield is raised, and a schematic view (1) of a working state of the dedusting shield are illustrated. The present invention provides a stage dedusting shield for a dust-free table saw, comprising: a shield assembly and a dust absorbing cover assembly; wherein the dust absorbing cover assembly is mounted between a follower board 11 and a rear portion of a saw blade 6 and is fixed by the follower board 11 mounted on a working stage 18. Since the saw blades 6 in the conventional table saws all rotate clockwise for cutting (from the tail of the motor), during workpiece cutting, wood chips and dusts generated at the front end of the saw blade (close to the saw teeth of the operator) are brought by the saw blade down to the underneath of the stage, and the wood chips generated at the rear portion of the saw blade (close to the saw teeth of the follower board) are generally aggregated at the workpiece and the stage. The dust suction cover 12 arranged at the relative position saves materials, and achieves dust-free wood cutting.

The dust suction cover assembly comprises a dust suction cover 12, a dust suction soft pipe 16 and a rear rocker arm 7 sleeved onto the exterior of the dust suction cover 12.

Further, a lower dust suction cover 15 is connected under the dust suction cover 12; wherein the lower dust suction cover 15 is connected to the dust suction cover 12 via a lower dust suction cover torsion spring 14 and a lower dust suction cover rotary pin 19. The lower dust suction cover 15 is horizontal at the bottom, and constantly maintains parallelly contact with the wood blocks 17 during workpiece feeding, thereby achieving a better protection effect.

The rear rocker arm 7 is fixed to the follower board 11 via a rocker arm positioning screw 8, a positioning press spring 9 and a locking handle 10.

The rear rocker arm 7 is connected to the shield assembly via a positioning steel wire 4, a rotary shaft and a screw, and the shield assembly comprises a front rocker arm 3, a right shield 1 and a left shield 5. The front rocker arm 3 rotates upwards for positioning relative to the rear rocker arm 7. In this way, during cutting, the saw blade 6 may be more visually observed, and the dust suction effect is not affected.

The front rocker arm 3 is connected to the right shield 1 and the left shield 5 via a shield torsion spring 2. The right shield 1 and the left shield 3 connected via the shield torsion spring 2 may be automatically adjusted upwards during workpiece feeding, which satisfies the safety requirements during cutting. The dust suction cover 12 is connected to a front shield 22 via a dust suction cover rotary pin 20, a front shield torsion spring 23 and the dust suction cover torsion spring 13. The front shield 22 rotates along with the dust suction cover 12, such that the wood chips are effectively protected from flying towards the operator and the wood chips are suctioned by the suction pipe.

The embodiments of the present invention are described in detail with reference to the accompanying drawings. However, the present invention is not limited to the embodiments described. For a person skilled in the art would derive various modifications, variations and replacements made to the embodiments without departing from the principle and spirit of the present invention shall all fall within the protection scope of the present invention.

The invention claimed is:

1. A stage dedusting shield for a dust-free table saw, comprising: a shield assembly and a dust suction cover assembly; wherein the dust suction cover assembly is mounted between a follower board and a rear portion of a saw blade and is fixed by the follower board,
   wherein the dust suction cover assembly comprises a dust suction cover and a rear rocker arm sleeved onto the exterior of the dust suction cover;
   wherein a lower dust suction cover is connected under the dust suction cover, wherein the lower dust suction cover is connected to the dust suction cover via a lower dust suction cover rotary pin and a lower dust suction cover torsion spring.

2. The stage dedusting shield for a dust-free table saw according to claim 1, wherein the rear rocker arm is fixed to the follower board via a rocker arm positioning screw, a positioning press spring and a locking handle.

3. The stage dedusting shield for a dust-free table saw according to claim 2, wherein the rear rocker arm is connected to the shield assembly via a positioning steel wire, a rotary shaft and a screw, and the shield assembly comprises a front rocker arm, a right shield and a left shield.

4. The stage dedusting shield for a dust-free table saw according to claim 3, wherein the dust suction cover is connected to a front shield via the dust suction cover rotary pin, a front shield torsion spring and the dust suction cover torsion spring.

5. The stage dedusting shield for a dust-free table saw according to claim 1, wherein the rear rocker arm is fixed to the follower board via a rocker arm positioning screw, a positioning press spring and a locking handle.

6. The stage dedusting shield for a dust-free table saw according to claim 5, wherein the rear rocker arm is connected to the shield assembly via a positioning steel wire, a rotary shaft and a screw, and the shield assembly comprises a front rocker arm, a right shield and a left shield.

7. The stage dedusting shield for a dust-free table saw according to claim 6, wherein the dust suction cover is connected to a front shield via the dust suction cover rotary pin, a front shield torsion spring and the dust suction cover torsion spring.

* * * * *